United States Patent
Riazi

[11] Patent Number: 6,084,027
[45] Date of Patent: *Jul. 4, 2000

[54] COMPRESSIBLE POLYURETHANE COMPOSITIONS HAVING MINIMAL TACK AND ARTICLES THEREFROM

[75] Inventor: John Riazi, Akron, Ohio

[73] Assignee: The Hygenic Corporation, Akron, Ohio

[*] Notice: This patent is subject to a terminal disclaimer.

[21] Appl. No.: 09/137,222

[22] Filed: Aug. 19, 1998

Related U.S. Application Data

[63] Continuation of application No. 08/933,719, Sep. 19, 1997, Pat. No. 5,798,411.

[51] Int. Cl.[7] .............................. C08J 3/00; C08K 3/20; C08L 75/00; C08G 18/00; C08G 18/30
[52] U.S. Cl. ........................... 524/590; 524/589; 528/44; 528/60; 528/65; 528/85
[58] Field of Search .................................. 524/589, 590; 528/44, 60, 65, 85

[56] References Cited

U.S. PATENT DOCUMENTS

| | | | |
|---|---|---|---|
| 3,413,243 | 11/1968 | Griffin | 260/2.5 |
| 3,601,923 | 8/1971 | Rosenberg | 46/151 |
| 3,677,997 | 7/1972 | Kaiser et al. | 260/332 |
| 4,008,197 | 2/1977 | Brauer et al. | 260/31.6 |
| 4,040,619 | 8/1977 | Landi | 272/68 |
| 4,289,813 | 9/1981 | Blomeyer et al. | 427/385.5 |
| 4,369,284 | 1/1983 | Chen | 524/476 |
| 4,618,213 | 10/1986 | Chen | 350/96.34 |
| 4,623,472 | 11/1986 | Jamison et al. | 252/12.2 |
| 4,711,445 | 12/1987 | Whitehead | 272/67 |
| 4,840,370 | 6/1989 | Biddlecombe | 272/68 |
| 5,011,135 | 4/1991 | Patik | 272/67 |
| 5,026,054 | 6/1991 | Osher et al. | 273/58 |
| 5,133,544 | 7/1992 | Patik | 482/49 |
| 5,145,473 | 9/1992 | Henry | 482/49 |
| 5,190,504 | 3/1993 | Scatterday | 482/49 |
| 5,319,021 | 6/1994 | Christy | 524/857 |
| 5,350,342 | 9/1994 | Scatterday | 482/49 |
| 5,457,139 | 10/1995 | Gabbard | 521/130 |
| 5,631,318 | 5/1997 | Ito et al. | 524/590 |
| 5,798,411 | 8/1998 | Riazi | 524/590 |

FOREIGN PATENT DOCUMENTS

| | | |
|---|---|---|
| 627451 A2 | 12/1994 | European Pat. Off. . |
| 1-299814 | 12/1989 | Japan ............ C08G 18/64 |

*Primary Examiner*—Patrick D. Niland
*Attorney, Agent, or Firm*—Renner, Kenner, Greive, Bobak, Taylor & Weber

[57] ABSTRACT

A polyurethane composition is provided for the formulation of a hand exercise device having a variety of configurations. The compositions comprise 140 parts by weight of a diol; from about 50 to 70 parts by weight of a diisocyanate compound, the diols and diisocyanate compounds being selected from the group consisting of reactants capable of forming polyurethanes; from about one to 30 percent by weight of a plasticizer, based upon the weight of the polyurethane composition; and from 0 to about 100 parts by weight of a mineral filler, based upon 100 parts by weight of the polyurethane composition.

6 Claims, 1 Drawing Sheet

COMPRESSIBLE POLYURETHANE COMPOSITIONS HAVING MINIMAL TACK AND ARTICLES THEREFROM

This application is a continuation of Ser. No. 08/933,719 filed Sep. 19, 1997 U.S. Pat. No. 5,798,411.

TECHNICAL FIELD

The present invention generally relates to a polyurethane-composition that is highly deformable when compressed as by squeezing but returns to its original shape when released and is additionally essentially tack free. The present invention also provides a device for strengthening the hand, wrist and arm.

BACKGROUND OF THE INVENTION

Handheld squeezable exercising devices are well known. These devices can generally be categorized into two groups: those with high compressibility and those with high resiliency. Devices with high compressibility are typified by putties and have poor or moderate resiliency. Griffin, U.S. Pat. No. 3,413,243, discloses a partially compressible ball consisting of a blend of various rubbers containing interconnected air cells. Kaiser, U.S. Pat. No. 3,677,997, and Christy, U.S. Pat. No. 5,319,021, disclose bouncing putties based upon organosiloxane-boron compound mixtures. Scatterday, U.S. Pat. No. 5,190,504, discloses a semi-resilient rubber-coated ball with a non-resilient particulate core.

Devices with high resiliency are exemplified by rubber balls or spring-loaded device. Often these devices cannot be compressed to the extent that the user can exercise using a full range of motion, i.e., moving the fingers from a substantially open position to a position where the fingers are only a few millimeters from the palm. In addition, these devices provide an increasing return force as the device is further and further compressed. Osher et al. (U.S. Pat. No. 5,026,054), for example, teaches a resilient, deformable ball consisting of a plasticized polymeric core and a flexible polymer shell. Biddlecombe (U.S. Pat. No. 4,840,370) teaches a convex block of resilient material such as foamed polyurethane with controllable resistance using multiple layers of polyurethane. Chen, U.S. Pat Nos. 4,618,213 and 4,369,234, disclose resilient balls made with poly(styrene-ethlylene-butylene-styrene) triblock copolymers and plasticizing oil; however, the oil tends to leach out onto the hands of the user, creating a mess and eventually causing the ball to become brittle.

Polyurethane compositions are also known. Brauer, U.S. Pat. No. 4,008,197, discloses a polyurethane composition containing 8 to 20 parts urethane polymer, 60 to 75 parts mineral oil, and 10 to 25 parts coupling agent. Jamison, U.S. Pat. No. 4,623,472, discloses a composition of isocyanate, polyol, catalyst and oil, where the oil constitutes at least 30 percent.

Thus, despite the numerous variations within the known art, a need still exists for a handheld exercising device that provides high compressibility, high resiliency and constant resistance throughout its range of compression and yet which also provides an appealing feel. The composition of the present invention can be shaped into a device that provides a compressibility, resiliency and feel that is well suited for exercising the hand, wrist and arm of the user.

SUMMARY OF THE INVENTION

It is therefore an object of the present invention to provide a polyurethane composition having both high compressibility and high resiliency.

It is another object of the present invention to provide a polyurethane composition of matter for hand exercising that is comfortable to hold and comfortable to squeeze.

It is a further object of the present invention to provide a polyurethane composition formed from a material having little or no tackiness.

It is an additional object of the present invention to provide a polyurethane composition of matter that can tolerate autoclaving and exposure to a sodium hypochlorite solution.

It is still another object of the present invention to provide a composition of matter, for hand exercising wherein the force required to compress it remains substantially constant, from uncompressed to fully compressed.

At least one or more of the foregoing objects, together with the advantages thereof over the known art relating to hand exercisers, which shall become apparent from the specification which follows, are accomplished by the invention as hereinafter described and claimed.

In general, the present invention provides a polyurethane composition comprising 140 parts by weight of a diol; from about 50 to 70 parts by weight of a diisocyanate compound, said diols and diisocyanate compounds being selected from the group consisting of reactants capable of forming polyurethanes; from about one to 30 percent by weight of a plasticizer, based upon the weight of the polyurethane composition; and from 0 to about 100 parts by weight of a mineral filler, based upon 100 parts by weight of the polyurethane composition.

PREFERRED EMBODIMENT FOR CARRYING OUT THE INVENTION

Figure 1:
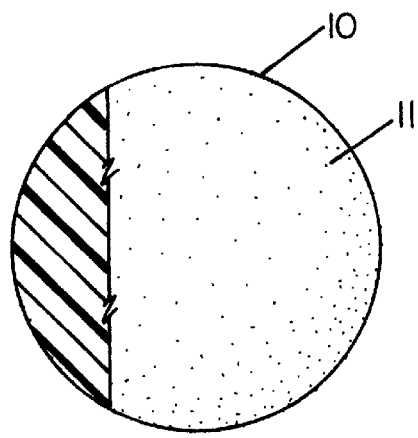
FIG. 1 is a plan view partially in section showing one form of article manufactured from the polyurethane composition of the present invention.
Figure 2:
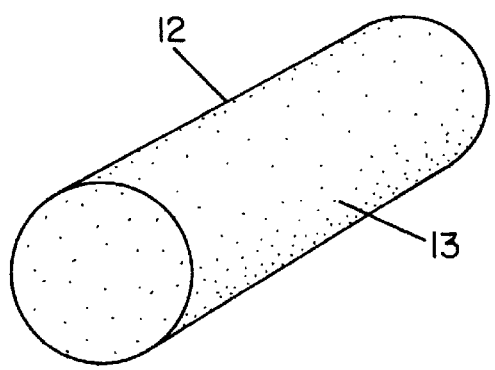
FIG. 2 is a perspective view showing another form of article manufactured from the polyurethane composition of the present invention.

The present invention is generally directed toward a polyurethane composition. The composition is moldable and hence, a variety of configurations are possible with round, spheroid shapes and cylinders being particularly suitable for hand exercise purposes. For purposes of describing the present invention, the term "device" has been selected as a specific type of article and is intended to include a squeezable object that has been molded to a configuration suitable for exercise purposes; however, neither the particular shape e.g. spherical, nor specific use thereof is a limitation of the invention.

During use, the device is squeezed in the hand, thereby strengthening the grip and musculature of the hand, wrist and arm. Upon release of compressive forces, the device returns to its original shape. Although the device of the present invention can be used as an exercising device for healthy individuals, it is envisioned that the device will be used primarily as a therapeutic aid by patients recovering from illnesses that weaken the hand, wrist, arm, or a combination thereof. The device of the present invention is particularly well adapted to use by weakened individuals because unlike conventional foam rubber balls, which have been used as an inexpensive aid to strengthen the hand, particularly its grip, by modifying the composition of the polyurethane compound according to the present invention, it is possible to obtain and provide a progressive series of devices, ranging from one which requires very little force to compress it, to others which require more force, commensurate with the strength developed by the user. This technique is particularly suitable to the patient recovering from injury or illness causing loss of grip strength and related use of the hand. The device of the present invention is also well suited for use by a therapist because it can be sterilized by autoclaving and/or immersion in sodium hypochlorite solutions, such as CLOROX® after use by a patient.

Heretofore, handheld exercising devices have failed to provide both high compressibility and high resiliency. High compressibility at forces so low that even a weak hand can achieve high. compressibility is desired. As noted hereinabove, known compositions of matter that exhibit high compressibility lack the resiliency of the present invention. Silly Putty®, for example, while providing high compressibility, deforms after being squeezed and remains deformed after being released. Therefore, after each squeeze, the exercise must be stopped and the Silly Putty® must be reformed into its original shape. Likewise, prior art materials exhibiting high resiliency, such as a rubber ball, can only be partially compressed.

An ideal hand exerciser would be one that will allow the hand to close completely (full range of motion) while it is being resisted. Furthermore, the hand exerciser mist be capable of being produced at graduated levels of resistance. The hand exerciser must also recover its original shape quickly enough to allow another repetition of the exercise within a reasonable time. Those versed in the art of polyurethane formulation know methods to approximate this "ideal" by varying the usual polyurethane compounding ingredients. An ideal set of formulations, would be made into balls of approximately two inches in diameter. These balls would be deformed by forces of 1.5, 3.0, 5 and 8 pounds to one inch thickness. These balls would recover to the original shape in about 20 seconds. It is known and noted that polyurethane formulated in such "softnesses" are inherently sticky materials. It has been found that additions of 1–30% by weight of mineral oils can progressively reduce and ultimately eliminate this stickiness.

Devices of the present invention comprise thermosetting polymers formed from very high molecular weight polymers and prepolymers. Particularly suitable are the polyurethanes resulting from the reaction of a polyol with a diisocyanate. Stoichiometrically, it is known that 100 parts by weight of diisocyanate are required for 140 parts by weight of polyol, in order to satisfy (react) all of the hydroxyl groups. Unlike the existing polyurethanes, however, the compositions of the present invention employ a range of between about 50 to 70 parts by weight of isocyanate per 140 parts by weight of polyol. As the amount of diisocyanate is reduced, the composition becomes softer, more resilient, but it also becomes more tacky, or sticky. Preferably, high molecular weight (weight average) polyols and pre-polymerized diisocyanates are employed in order to minimize the end points. Conventionally employed diols and diisocyanates are readily available for practice of the present invention.

It has unexpectedly been found that the undesirable tackiness of the polyurethane composition formulated with less diisocyanate can be reduced and essentially eliminated by the addition of mineral oil. Accordingly, the next component of the polyurethane composition is mineral oil, which is utilized as a plasticizer. Mineral oil is a low viscosity oil that is a by-product of hydrocarbon fractionation.

It comprises from one up to about 30 percent by weight of the polyurethane composition. As the diisocyanate to polyol stoichiometry is lowered, that is, less than 70 parts by weight of diisocyanate, the percentage of oil can be increased. As an example, the amounts of diisocyanate per 140 parts by weight of polyol are set forth in Table I for varying relative percentages of oil.

TABLE I

| RATIO OF DIISOCYANATE COMPONENT TO MINERAL OIL | |
|---|---|
| Parts by weight - diisocyanate | Percent by weight - mineral oil |
| 60 | 7 |
| 57.5 | 8 |
| 55 | 9 |
| 53 | 10 |

As the amount of diisocyanate is increased from 50 to 70 parts by weight, compressibility of the of the composition is decreased. The polyurethane composition is catalyzed by the addition of a known polyurethane catalyst, such as dibutyl tin dilaurate in amounts ranging from 0.01 to about 1 percent by weight, depending upon the speed of the reaction desired. Preferred weight average molecular weights are those known to produce compressible yet resilient elastomers. As the percentage of oil is increased, the tackiness of the compound is reduced. At about 30 percent loading of oil, blooming occurs and thus, the device could additionally be formulated with pharmaceutically affective amounts of medicaments such as analgesics, vitamins, humectants and the like.

In addition to the foregoing components, the polyurethane composition may also include fillers such as calcium carbonate, clays and the like which make the composition stiffer. Amounts ranging from about 0 to about 100 parts by weight can be added, based upon the 100 parts by weight (phr) of the polyurethane composition, with 10 to 50 being preferred where a filler is optionally employed. Dyes and pigments can also be added, particularly as an indicator of compound stiffness or the degree of resistance and also to impart an aesthetic appearance to the composition. Such materials are well known in the art. Amounts are not critical as they do not affect compressibility or resilience of the composition. Additional optional components include fragrances, odorants, reodorants and the like.

Preparation of the polyurethane composition of the present invention is conducted as follows. First, all components are degassed under vacuum. The polyol and all other components except the diisocyanate are masterbatched. The masterbatch is vacuum degassed after mixing and 140 parts by weight of polyol and the required amount of diisocyanate for each desired compressibility are mixed for about 20 seconds. The mixture is vacuum degassed rapidly and poured into a suitable mold and cured at 220° F. for 40 minutes, removed from the mold and then postcured at 220° F. for four hours. The cooled articles are then dusted or rolled in talc or cornstarch to remove any residual tack and leave a dry, velvety feel to the hand.

In order to demonstrate practice of the present invention, four examples each having a different stiffness, were prepared with the formulations set forth in Table II.

TABLE II

| POLYURETHANE COMPOSITIONS | | | | |
|---|---|---|---|---|
| | 1 | 2 | 3 | 4 |
| Polyol | 140 | 140 | 140 | 140 |
| Diisocyanate | 53 | 55 | 57.5 | 60 |
| Oil | 10 | 9 | 8 | 7 |

The force necessary to reduce the diameter of a two inch ball to one inch was measured in pounds and has been presented in Table III hereinbelow. It is to be understood that this is only a measure of a property and the ball or other device can be compressed to more than 50 percent of its original diameter or size and still return to its resting stage when the force is withdrawn.

TABLE III

| PHYSICAL PROPERTIES | | | | |
|---|---|---|---|---|
| | 1 | 2 | 3 | 4 |
| Force to one-half diameter (pounds) | 1 | 3 | 5 | 8 |

As another advantage of the present invention, the polyurethane composition can be microwaved to add heat therapy to the device during usage.

Figure 3:
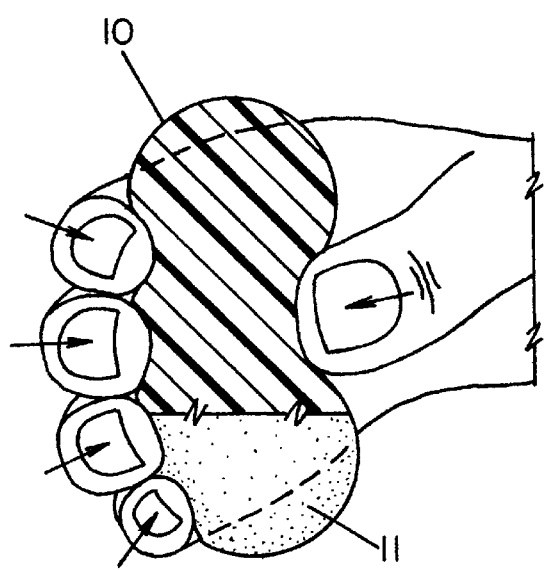
FIG. 3 is a plan view showing an exercising device manufactured from the polyurethane composition of the present invention compressed by the hand of a user.

With reference now to the drawings, an exercise device according to the present invention is depicted in FIG. 1 as a round, solid ball 10, comprising the polyurethane composition of the present invention, coated with a light layer of talc 11 or the like, to reduce tackiness. Of course, the device is not limited to manufacture in spherical shape, for instance, the an alternative form of device is a solid cylinder 12, which may also carry a coating of talc 13, or similar substance to reduce tackiness. One typical use of the device is depicted in FIG. 3, in which the ball 10 has been squeezed within a hand, compressing it to about one-half of its original diameter. As the hand is released, the ball 10 returns to its original spherical shape, owing to its resiliency and, because the polyurethane compound is not sticky or tacky, the ball does not adhere to the fingers of the hand.

While an exercise device has been depicted, including spherical and cylindrical shapes, it is to be appreciated that the polyurethane composition can readily be fashioned into a variety of other shapes and configurations depending upon the type of exercise desired. As noted hereinabove, the formulation can be varied to provide progressive ranges of compressibility, as reported in Table III, for the device manufactured, in order to accommodate either a plurality of users or, a necessary progression of muscle development, rehabilitation, or the like. Moreover, the devices can be utilized for other forms of exercise than merely working the hand, owing to the compressibility and resiliency of the composition and its lack of tack. Similarly, the polyurethane compositions of the present invention can be utilized to manufacture other products or devices than exercise equipment.

Based upon the foregoing disclosure, it should now be apparent that the use of the polyurethane composition of matter and device formed therefrom as described herein will carry out the objects set forth hereinabove. It should also be apparent to those skilled in the art that the compositions of the present invention can be made into a variety of configurations. Similarly, the polyurethane compositions can be formulated to provide a range of compressive resistances.

It is, therefore, to be understood that any variations evident fall within the scope of the claimed invention and thus, the selection of particular diols and diisocyanates, plasticizers and the like can be determined without departing from the spirit of the invention herein disclosed and described. Moreover, the scope of the invention shall include all modifications and variations that may fall within the scope of the attached claims.

What is claimed is:

1. A polyurethane composition comprising:

140 parts by weight of a polyol;

from about 50 to 70 parts by weight of a diisocyanate compound, said polyol and diisocyanate compounds being selected from the group consisting of reactants capable of forming polyurethanes;

from about one to 30 percent by weight of a plasticizer based upon the weight of the polyurethane composition; and from 0 to about 100 parts by weight of a mineral filler, based upon 100 parts by weight of the polyurethane composition, said polyurethane composition having an iso index of up to about 0.7.

2. A polyurethane composition, as set forth in claim 1, comprising 140 parts by weight of said polyol;

60 parts by weight of said diisocyanate compound; and seven percent by weight of a plasticizer based upon the weight of the polyurethane composition.

3. A polyurethane composition, as set forth in claim 2, comprising 140 parts by weight of said polyol;

57.5 parts by weight of said diisocyanate compound; and eight percent by weight of a plasticizer based upon the weight of the polyurethane composition.

4. A polyurethane composition, as set forth in claim 2, comprising 140 parts by weight of said polyol;

55 parts by weight of said diisocyanate compound; and nine percent by weight of a plasticizer based upon the weight of the polyurethane composition.

5. A polyurethane composition, as set forth in claim 2, comprising 140 parts by weight of said polyol;

53 parts by weight of said diisocyanate compound; and 10 percent by weight of a plasticizer based upon the weight of the polyurethane composition.

6. A polyurethane composition, as set forth in claim 1, wherein said mineral fillers are selected from the group consisting of calcium carbonate and clays.

\* \* \* \* \*